(12) United States Patent
Brouwer et al.

(10) Patent No.: US 7,039,056 B2
(45) Date of Patent: May 2, 2006

(54) HIGH QUALITY AUDIO AND VIDEO OVER DIGITAL SUBSCRIBER LINES (DSLS)

(75) Inventors: Wim L. Brouwer, North Aurora, IL (US); Carl Robert Posthuma, Wheaton, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 1065 days.

(21) Appl. No.: 09/921,109

(22) Filed: Aug. 2, 2001

(65) Prior Publication Data

US 2003/0026265 A1 Feb. 6, 2003

(51) Int. Cl.
*H04L 12/28* (2006.01)
*H04L 12/56* (2006.01)

(52) U.S. Cl. ............... 370/395.43; 370/535; 370/468

(58) Field of Classification Search ........ 370/395.42, 370/395.1, 395.2, 395.21, 395.4, 395.43, 370/395.51, 395.52, 395.61, 535, 537, 468
See application file for complete search history.

(56) References Cited

U.S. PATENT DOCUMENTS

| | | | |
|---|---|---|---|
| 5,754,529 A | 5/1998 | Heiss | 370/232 |
| 5,771,350 A | 6/1998 | Kim | 395/200.8 |
| 6,188,697 B1 * | 2/2001 | Umehira et al. | 370/412 |
| 6,198,724 B1 * | 3/2001 | Lam et al. | 370/233 |
| 6,515,963 B1 * | 2/2003 | Bechtolsheim et al. | 370/229 |
| 6,618,378 B1 * | 9/2003 | Giroux et al. | 370/395.1 |
| 6,690,678 B1 * | 2/2004 | Basso et al. | 370/468 |
| 2004/0071216 A1 * | 4/2004 | Richardson et al. | 375/240.21 |

FOREIGN PATENT DOCUMENTS

WO 9917482 4/1999

\* cited by examiner

*Primary Examiner*—Brian Nguyen

(57) ABSTRACT

A Digital Subscriber Line (xDSL) is used to connect Customer Premises Equipment (CPE) to a telecommunications network. The Customer Premises Equipment generates both Constant Bit-Rate (CBR) and Variable Bit-Rate (VBR) Packets. Each Frame of Packets from the Customer Premises Equipment is used to transmit up to a limited amount of CBR data, and VBR data is used, if available, to fill up the Frame. The limit on the amount of CBR data can be dynamically adjusted according to the need of the CPE. Similarly, and importantly, a limit on CBR data to the CPE can be adjusted dynamicaly according to the need for transmission of CBR data to the CPE. Advantageously, a guaranteed rate of transmission of CBR data can be maintained, even in the face of a flood of VBR traffic. Advantageously, this arrangement improves the quality of service on CBR traffic, such as Voice, and subject to the limit imposed by CBR traffic, allows a maximum amount of VBR traffic to be transmitted.

5 Claims, 3 Drawing Sheets

HIGH QUALITY AUDIO AND VIDEO OVER DIGITAL SUBSCRIBER LINES (DSLS)

TECHNICAL FIELD

This invention relates to the transmission of data packets carrying voice and video signals over high-speed Digital Subscriber Lines (DSLs).

Problem:

A common arrangement for connecting telecommunications customers to a telecommunications network is the use of a Digital Subscriber Line (DSL). For customers who have a need for a high data rate for their connections, a very high speed DSL (VDSL) is used. A VDSL has the capacity for carrying moving video signals as well as voice and data signals to and from such a customer. Asymmetric DSL (ADSL) is used for users in which the desired downstream bit rate is much higher than the desired upstream bit rate; Symmetric DSL (SDSL) is used for cases in which the desired downstream and upstream bit rate is the same. Hereinafter, the term xDSL will be used for any type of DSL, both in the description and the claims.

Broadly speaking, the data signals which are transmitted in packets include Constant Bit-Rate (CBR) Packets, and Variable Bit-Rate (VBR) Packets. VBR Packets as used herein, are packets whose arrival time and/or size can be random, and for which the amount and variation of delay is not critical. CBR packets are packets whose arrival time and/or size is predictable, and for which minimizing the amount and/or variation of delay is critical. These packets can be carried, for example, as Internet Protocol (IP) over DSL or Asynchronous Transfer Mode (ATM) over DSL. An example of a Constant Bit-Rate (CBR) Packet is a usually small packet used for transmitting speech; for the packets used to transmit a conversation, the quality of service of a connection suffers badly when the delay for different packets representing signals of a speech conversation are delayed by differing amounts. An example of a large CBR Packet is one used for transmitting video. An example of a Variable Bit-Rate (VBR) Packet is a packet that is part of a group of large packets transmitting a long computer file; if there is a delay in this transmission, the result is that the file is transmitted a bit more slowly.

Giving CBR Packets simple priority over VBR Packets does not solve the problem, since the CBR Packets not only require minimally delayed transmission, but require a relatively fixed delay (minimum jitter)between successive packets of a particular message.

A problem of the prior art is that there is no good way of providing satisfactory grade of transmission of mixed CBR and VBR traffic over a DSL Facility; this is especially true if the DSL facility carries IP traffic directly over the DSL facility.

Solution:

Applicants have analyzed this problem, and have recognized that mixing CBR Packets with large, bursty VBR Packets, makes it very difficult to minimize delay and jitter for CBR Packets, even if the large VBR Packets are broken into smaller VBR Packets.

The above problem is substantially alleviated in accordance with the principles of this invention, wherein CBR and VBR data are placed in separate First-In/First-Out (FIFO) Queues; the output of these queues is then merged into fixed length frames, each frame containing a limited amount of CBR data, and fill the rest of the frame with VBR data. A Controller adjusts this limit dynamically as requirements for CBR traffic change. Advantageously, with this arrangement, the rate of transmission of one or more priority level CBR Packets and one or more priority level VBR Packets can be placed in a plurality of Queues, and the process of combining the output of the VBR Queues with the CBR Queues can be modified to favor the higher priority CBR Queues, and, further, to favor higher priority VBR Queues.

BRIEF DESCRIPTION OF THE DRAWING(S)

DETAILED DESCRIPTION

Figure 1:
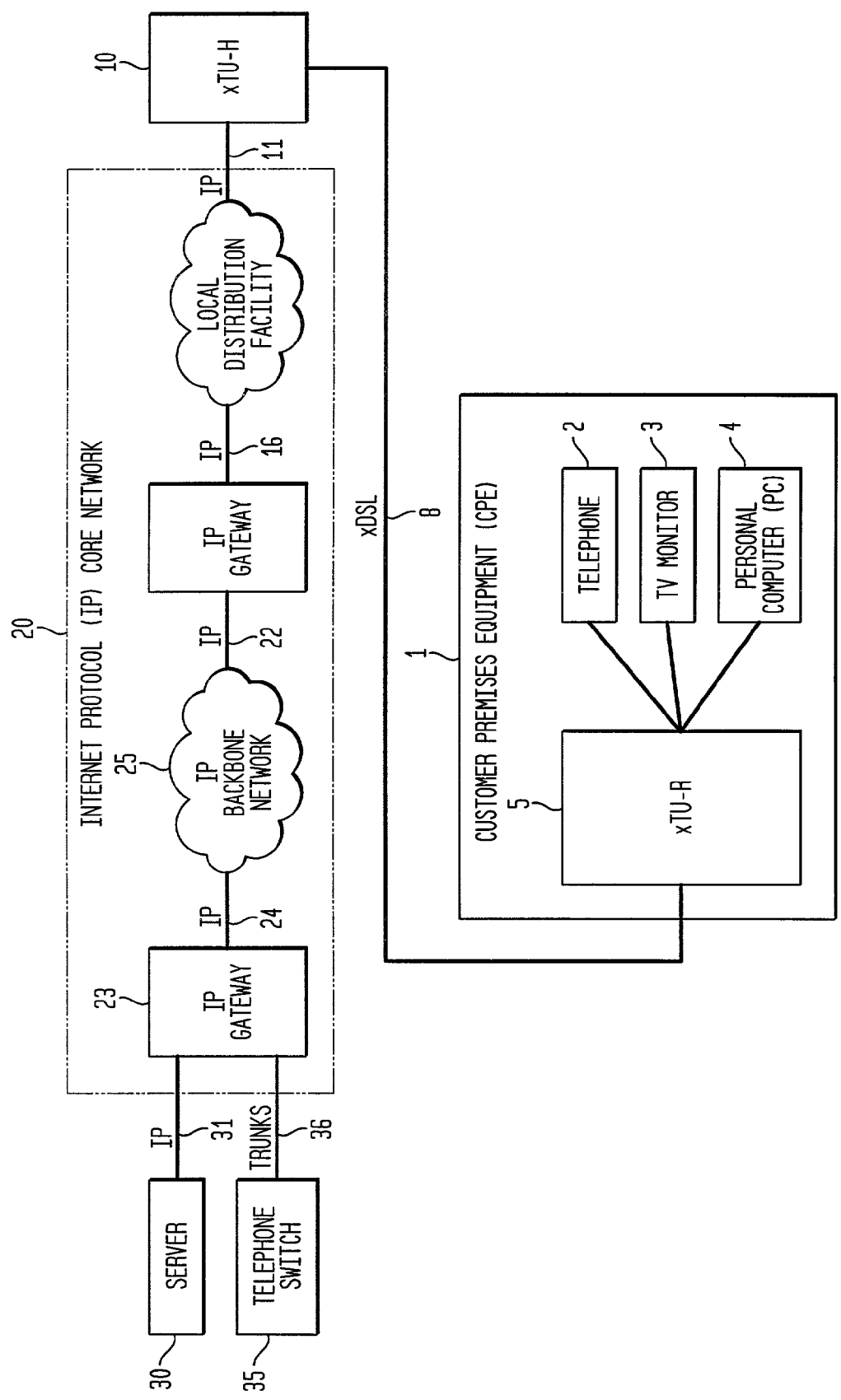
FIG. 1 is a block diagram illustrating Applicants' invention.

FIG. 1 is a block diagram illustrating Applicants' invention. Customer Premises Equipment (CPE) (1) includes a Telephone (2), a Video Monitor (3), and a Personal Computer (PC) (4). All are connected to a xDSL Terminating Unit for a remote site (xTU-R). This xTU-R is described in detail with respect to FIG. 2 below. xTU-R is connected to Host xTU, (xTU-H) (10).

In the preferred embodiment, the xTU-H is connected by an IP Facility (11) to an IP Core Network (20). Within the Core Network, xTU-H (10) is connected to a local distribution facility (15), which is used to concentrate traffic over IP facility (16) to an IP Gateway (21). The IP Gateway (21) is connected via an IP facility (22) and via the IP Backbone Network (25)and via another IP facility (24), to another IP Gateway (23), which is connected to Servers such as Server (30) through an IP facility (31), and Telephone Switches, such as Telephone Switch (35), through trunks (36). Server (30) may be connected to PC (4) in a connection which is predominantly a Packet connection comprising VBR Packets, and the Telephony Switch can be connected to Telephone (2) by a Packet connection that consists primarily of CBR Packets. In some cases, Server (30), or another Server, may be connected to Video Monitor (3) by a connection similar to that established between Server (30) and PC (4); this connection can be either for VBR Packets (still displays), or CBR Packets (moving displays).

Figure 2:
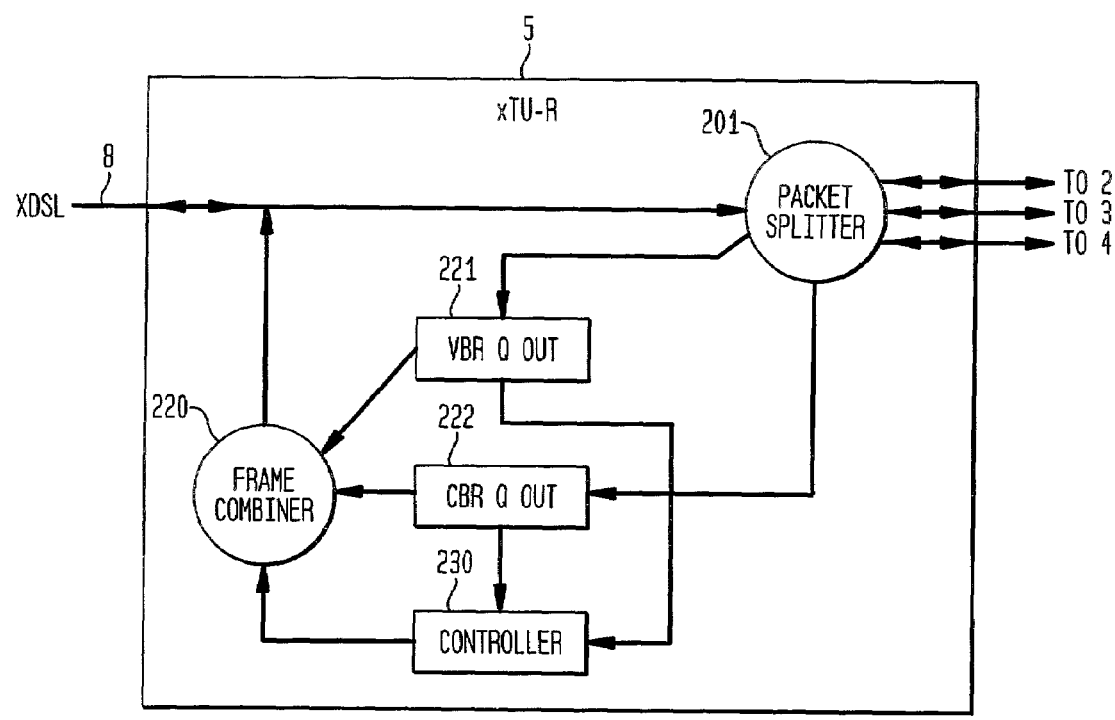
FIGS. 2 and 3 are diagrams presenting details of one of the elements shown in FIG. 1.

FIG. 2 illustrates the pertinent details of xTU-R related to this invention. Telephone (2), TV (3), and PC (4), are connected through Packet Splitter (201) to two FIFO Queues. FIFO Queues (221) and (222) contain VBR and CBR data, respectively, received from PC (4), TV (3), and Phone (2). Controller (230) receives inputs from Queues (221) and (222), and uses these inputs to determine the split between VBR and CBR data for forming a xDSL Frame. A Frame Combiner (220) takes data from Queues (221) and (222) to form a xDSL Frame. The Frame Combiner (220) receives an input from Controller (230), which will determine how much CBR data to take from Queue (222), and how much VBR data to take from VBR Queue (221). If the amount of CBR data in Queue (222) is less than an upper limit of the amount of CBR data which can be transmitted in an xDSL Frame as determined by Controller (230), then Frame Combiner (220) can take additional VBR data, (if any exists), from Queue (221) to fill out the xDSL Frame. If enough VBR data is unavailable to fill out the frame, then fill data is generated for that purpose.

Incoming signals from xDSL (8) go to Packet Splitter, Splitter/Combiner (201), and are transmitted thence to the terminal device, i.e., the telephone, the video monitor, or the PC. In this preferred embodiment, each packet has a Header for identifying the terminal device.

Controller (230) has the basic function of determining the maximum amount of CBR data per frame. If less than this maximum amount of CBR data is available for transmission to the xTU-H, then the frame can be filled with additional VBR data, and if not enough VBR data is available, then with Fill data. Controller (230) adjusts this upper limit dynamically, depending on the needs of the devices attached to the xTU-R for CBR data. The strategy for adjusting this limit can be based on the specific traffic demand of the various devices, in which case, it can be adjusted up or down as each device requests a greater or lesser CBR rate; or it can be adjusted dynamically as the amount of CBR data in Queue (222) varies, so that the amount of CBR data is never too high (indicating too low of a limit), or that the CBR Queue is nearly empty, or empty (indicating that the limit is too high). The problem with an excessively high limit is that the amount of VBR traffic that can go through the xTU-R is thereby unnecessarily throttled. Further, the Controller can arrange to have a limit that is a fractional number of packets. For example, the limit on alternate frames can be 6 and 7 CBR Packets leading to an effective limit of 6.5 Packets.

Figure 3:
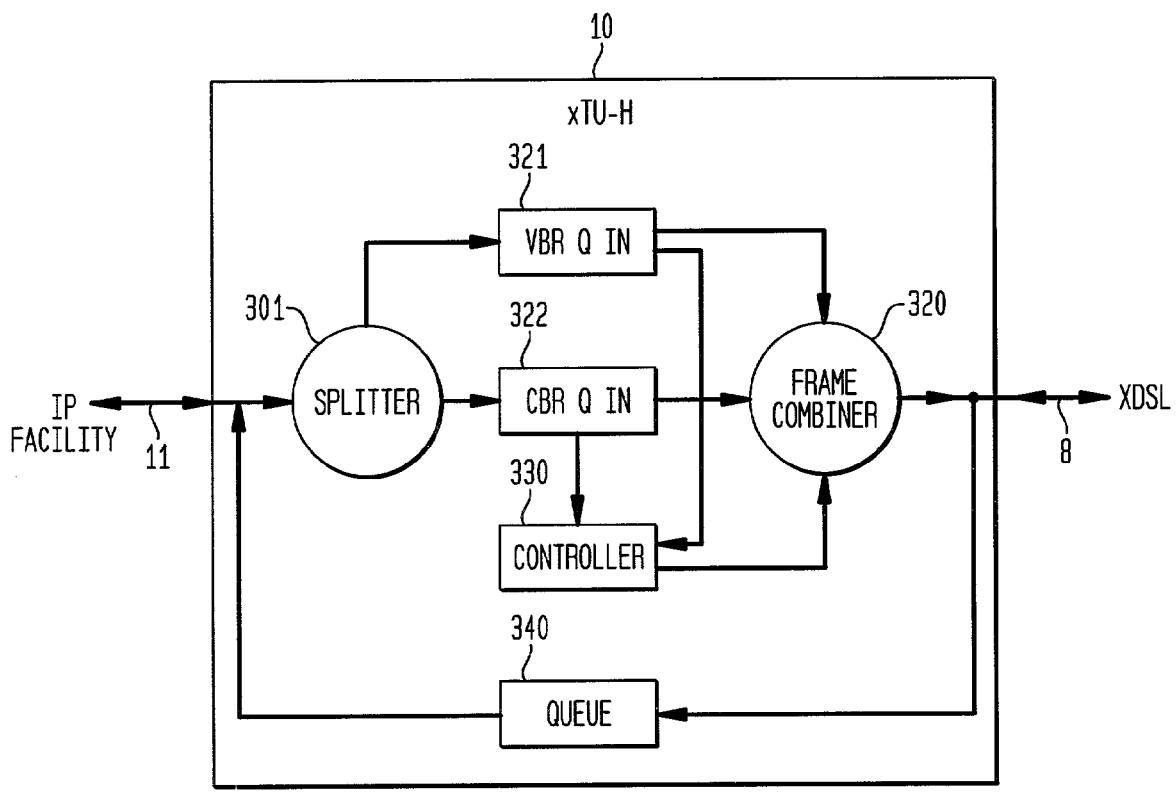

FIG. 3 illustrates the pertinent details of xTU-H/(10). This unit is connected to IP facility (11) and xDSL Line (8). FIFO Queues (321) and (322) contain VBR and CBR data, respectively, received from IP Facility (11). Controller (330) receives inputs from Queues (321) and (322), and uses these inputs to determine the split between VBR and CBR data for forming an xDSL Frame for transmission to xDSL line (8). A Frame/Combiner (320), takes packets from Queues (321) and (322) to form an xDSL Frame. The Frame/Combiner receives an input from Controller (330), which will determine how much CBR data to take from Queue (322), and how much VBR data to take from Queue (321). If the amount of CBR data in Queue (322) is less than the upper limit on the amount of CBR data which can be transmitted in an x-DSL frame, as determined by Controller (330), then Frame/Combiner (320) can take additional VBR data (if any exists), from Queue (321) to fill out the xDSL Frame. If enough VBR data is not available to fill out the frame, then fill data is generated for that purpose.

Incoming signals from xDSL Line (8) are placed in a Queue (340) for transmission to the IP Facility (11).

Controller (330) has the basic function of determining the maximum amount of CBR data for a frame to be transmitted to xDSL Line (8). If less than this amount of CBR data is available for transmission to xDSL (8), and thence to xTU-R, then the frame can be filled with VBR data, and if not enough VBR data is available, then with fill data. Controller (330) adjusts this upper limit dynamically, depending on the data received from IP Facility (11). The strategy for adjusting this limit can be based on the specific traffic demand of the various devices attached to the xTU-R, in which case it can be adjusted up or down as each device requests a greater or lesser CBR input rate; or it can be adjusted dynamically as the amount of CBR data in Queue (322) varies, so that the amount of CBR data is never too high (indicating too low of a limit), or that the CBR Queue is nearly empty, or empty (indicating that the limit is too high). The problem with an excessively high limit is that the amount of VBR traffic that can go through the xTU-H is thereby unnecessarily throttled.

Within the IP Core Network, a differentiation is made between higher priority and lower priority Packets; thus, CBR Packets are marked with an indication of appropriate priority, (possibly, an especially high priority for speech Packets), and VBR Packets are marked with an appropriate priority indicator. Some VBR Packets, for example, Packets representing Alarm Conditions, may have quite a high priority. Further, within CBR data, differentiation is expected for Speech Packets. While only one CBR Queue (222) and VBR Queue (221) are shown in FIG. 2, a plurality of CBR and/or VBR Queues can be used to differentiate among different priority level CBR and VBR Packets. The Frame Combiner (220) can then take VBR data from a High Priority Queue, in preference to VBR data, from a Low priority Queue.

Figure 4:
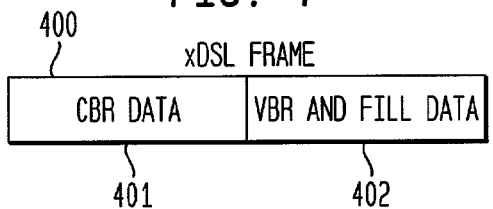
FIG. 4 shows the layout of a typical Internet Protocol (IP) frame transmitted from Customer Premises Unit (CPU) over an xDSL facility.

FIG. 4 shows the layout of xDSL Frame (400). It includes CBR data (401), VBR or Fill data (402). As discussed above, both CBR and VBR Packets are marked with the appropriate priority indicator.

The above description is of one preferred embodiment of Applicants' invention. Other embodiments will be apparent to those of ordinary skill in the art without departing from the scope of this invention. The invention is limited only by the attached claims.

The invention claimed is:

1. Apparatus for transmitting VBR (Variable Bit-Rate) and CBR (Constant Bit-Rate) Packets over a telecommunications network, comprising:
   means for separating VBR data from CBR data;
   means for combining a limited amount of CBR data with an additional amount of VBR data to form a frame of data;
   means for dynamically altering a limit on the amount of CBR data that is combined into each frame; and
   means for transmitting said frame of data to a telecommunications network;
   wherein said limit on the amount of CBR data that is combined into each frame is adjusted in response to the amount of CBR data waiting to be transmitted.

2. The apparatus of claim 1, wherein said frame is an xDSL Frame.

3. The apparatus of claim 1 wherein said means for dynamically altering further comprises:
   means for adjusting said limit as new traffic is generated, or old traffic is terminated.

4. The apparatus of claim 1, wherein said telecommunications network is an Internet Protocol (IP) Network.

5. The apparatus of claim 1, further comprising means for identifying a priority level for each packet;
   wherein said telecommunications network routes each marked packet according to its priority marking.

* * * * *